US008098254B2

(12) United States Patent
Sreenivas et al.

(10) Patent No.: US 8,098,254 B2

(45) Date of Patent: Jan. 17, 2012

(54) POWER SAVINGS IN A COMPUTING DEVICE DURING VIDEO PLAYBACK

(75) Inventors: Krishnan Sreenivas, Santa Clara, CA (US); Koen Bennebroek, Santa Clara, CA (US); Sanford S. Lum, San Jose, CA (US); Karthik Bhat, Sunnyvale, CA (US); Stefano A. Pescador, Sunnyvale, CA (US); David G. Reed, Saratoga, CA (US); Brad W. Simeral, San Francisco, CA (US); Edward M. Veeser, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/007,431

(22) Filed: Jan. 14, 2011

(65) Prior Publication Data

US 2011/0109639 A1 May 12, 2011

Related U.S. Application Data

(62) Division of application No. 11/614,365, filed on Dec. 21, 2006, now Pat. No. 7,876,327.

(51) Int. Cl.
*G06F 13/00* (2006.01)
*G09G 5/36* (2006.01)
*G09G 5/37* (2006.01)

(52) U.S. Cl. ........ 345/538; 345/537; 345/547; 345/556; 345/562

(58) Field of Classification Search .......... 345/536–538, 345/562, 545, 547, 548, 556
See application file for complete search history.

(56) References Cited

U.S. PATENT DOCUMENTS 5,912,710 A * 6/1999 Fujimoto ...................... 348/445

* cited by examiner

*Primary Examiner* — Hau Nguyen

(74) *Attorney, Agent, or Firm* — Patterson & Sheridan, LLP

(57) ABSTRACT

Display data and video data are stored within a graphics processing unit to reduce power consumed by the computing device during video playback. Storing display data and video data within the GPU reduces power consumption, because bus transaction activity is reduced and the need to read data from a larger, common main memory is avoided.

10 Claims, 9 Drawing Sheets

POWER SAVINGS IN A COMPUTING DEVICE DURING VIDEO PLAYBACK

CROSS-REFERENCE TO RELATED APPLICATIONS

This application is a divisional of U.S. patent application Ser. No. 11/614,365, filed Dec. 21, 2006, will issue as U.S. Pat. No. 7,876,327 on Jan. 25, 2011

BACKGROUND OF THE INVENTION

1. Field of the Invention

Embodiments of the present invention relate generally to the field of video playback using a graphics processing unit ("GPU") and more specifically to a system and method for video playback using a memory local to a GPU that reduces power consumption.

2. Description of the Related Art

High performance mobile computing devices typically include high performance microprocessors and graphics adapters as well as large main memories. Since each of these components consumes considerable power, the battery life of a high performance mobile computing device is usually quite short. For many users, battery life is an important consideration when deciding which mobile computing device to purchase. Thus, longer battery life is something that sellers of high performance mobile computing devices desire.

As mentioned, the graphics adapters found in most high performance mobile computing devices consume considerable power, even when performing tasks like generating frames for display during video playback. For example, a typical graphics adapter may generate twenty to sixty frames per second. For each frame, the graphics adapter usually reads and writes large blocks of display data and video data from and to main memory. Power consumption during these read and write operations is considerable because they typically include repeatedly transferring blocks of display data and video data between main memory and the graphics adapter through intermediate elements, such as a high speed bus, a bus controller and a memory controller.

FIG. 1 illustrates a conventional mobile computing device 100 that uses video data and display data stored in main memory to generate display frames. During video playback, the mobile computing device 100 stores video data and display data in main memory and generates a sequence of display frames through read and write operations performed on the main memory by a GPU 102. As shown, the computing device 100 includes the GPU 102, a bus 112, a microprocessor 104, a main memory 106, an I/O controller 108, and a DVD player 110. The GPU 102 is coupled to the microprocessor 104 through the bus 112. The microprocessor 104 includes a memory controller 134 and is coupled to the main memory 106, which stores a software driver 138 and an application program 136, as well as display data 140 and video data 142, and the I/O controller 108, which controls the DVD player 110. The GPU 102 includes display logic 128, which generates display frames by overlaying video pixels onto display pixels during video playback, a frame buffer 124, which includes control logic 144 and generates video pixels and display pixels from video data and display data stored in the main memory 106, and a bus interface controller 126, which transfers video data and display data between the frame buffer 124 and the main memory 106 during pixel generation. The control logic 144 receives display pixel and video pixel requests from the display logic 128 and directs the bus interface controller 126 to read and write display data and video data from and to the main memory 106 during pixel generation.

When a user requests video playback from the DVD player 110, the application program 136 reads video data from the DVD player 110, stores that data in the main memory 106 as video data 142, and directs the software driver 138 to configure the GPU 102 to generate a sequence of display frames from the video data 142. Generating each new display frame begins with the display logic 128 requesting display pixels and video pixels for generating the next display frame from the frame buffer 124, which generates these pixels from display data and video data read by the control logic 144 from the main memory 106. The video data is stored in the main memory 106 as a series of encoded video images with an industry standard encoding technique, such as the Motion Picture Expert Group ("MPEG") encoding standard. Typically, the video data 142 is constantly changing as the application program 136 reads a future encoded video data from the DVD player 110 and adds this encoded video data to the main memory 106 while the GPU 102 reads the next encoded video data from the main memory 106 and discards previously-read encoded video data from the main memory 106. In contrast to the constantly changing video data 142, the display data 140 represents regions of uniform color that do not typically change from one display frame to the next.

The regions of uniform color in the display data 140 are configured to support overlay of video images onto a display image background. By defining a region of one color, the software driver 138 configures the display logic 128 to display video pixels generated from the video data 142 over display pixels of that predefined color generated from the display data 140. For example, if the software driver 138 configures the GPU 102 to overlay a full screen video image with a 4×3 aspect ratio onto a background image with a 4×3 aspect ratio, the full screen video image completely obscures the background image. In another example, if the software driver 138 configures the GPU 102 to overlay a full screen video image with a 16×9 aspect ratio onto a background image with a 4×3 aspect ratio, the resulting overlaid images will show a full screen video image with a top and bottom frame whose color is determined by the corresponding display pixels.

Once the display logic 128 requests display pixels and video pixels for generating the next display frame from the frame buffer 124, causing the control logic 144 to read display data 140 or video data 142 from the main memory 106, the control logic 144 directs the frame buffer 124 to transmit each read request to the bus interface controller 126. For each read request the bus interface controller 126 receives, it transmits the read request to the memory controller 134, which reads the requested data from the main memory 106 and returns the requested data ("the read response") to the GPU 102. Upon receiving the requested display data 140 and video data 142, the display logic 128 decodes the video data 142 to form a video image and generates a display image from the display data 140, before overlaying the video image onto the display image and generating a display frame accordingly.

One drawback of the computing device 100 is that multiple read and write operations between the GPU 102 and the main memory 106 consume substantial power, which can reduce the battery life for mobile computing devices. For example, read operations through the bus 112 consume power as a result of transmitting a read request from the frame buffer 124 to the memory controller 134 and transmitting a read response from the memory controller 134 to the frame buffer 124 for each read operation. Additionally, reading display data 140 or video data 142 from the main memory 106 may consume substantial power in the main memory 106 and in the memory controller 134.

SUMMARY OF THE INVENTION

The present invention employs local memory to reduce power consumption during video playback. According to an embodiment of the present invention, display data and video data for video playback are stored within memory local to a GPU to reduce memory traffic between the GPU and main memory. The reduction in memory traffic results in lower power consumption during video playback. Once display data is stored within the GPU local memory, display data is typically no longer read from the main memory during generation of each display frame. Storing video data in the GPU local memory allows some or all video decoding computations to be performed locally and avoids frequently reading and writing from and to the main memory.

A processing unit according to an embodiment of the present invention is configured with multiple local memory units. The first local memory unit stores run-length encoded display data. The second local memory unit stores encoded video data. The processing unit includes a run-length encoding engine that generates display pixels from the encoded display data, an MPEG engine that generates video pixels from the encoded video data, and a display logic unit that generates a display frame from the display pixels and the video pixels.

The validity of the encoded display data stored in the run-length encoding engine and the encoded video data stored in the MPEG engine is determined with reference to status bits that are maintained by the processing unit. The status bit for the encoded display data is set to be valid when display data are read from main memory and encoded by the run-length encoding engine. It is set to be invalid when the GPU, through a snoop logic unit, detects changes to the display data. The status bits for the video data are set to be valid or invalid under software control.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

During DVD playback, typical mobile computing device users set their display configuration once and maintain that display setting through most or all of the DVD viewing. Unless the display settings change during playback, the mobile computing device will generate identical display images and overlay constantly changing video images on the display images to form the sequence of display frames. Generating many identical display images involves reading identical display data from main memory and performing identical graphics computations to generate the display images. Additionally, decoding the video images read from the DVD player typically includes numerous read and write operations on video data stored in memory.

Efficiencies may be realized by storing a copy of display data and some or all video data within the GPU, thereby eliminating or reducing the need to fetch both sets of data from main memory. Further efficiencies may be realized by using run-length encoding ("RLE") to reduce the amount of memory used when storing the display data in the GPU. Overall, the aforementioned efficiencies may substantially reduce the power consumed in the mobile computing device relative to prior art solutions while maintaining high graphics performance.

Figure 1:
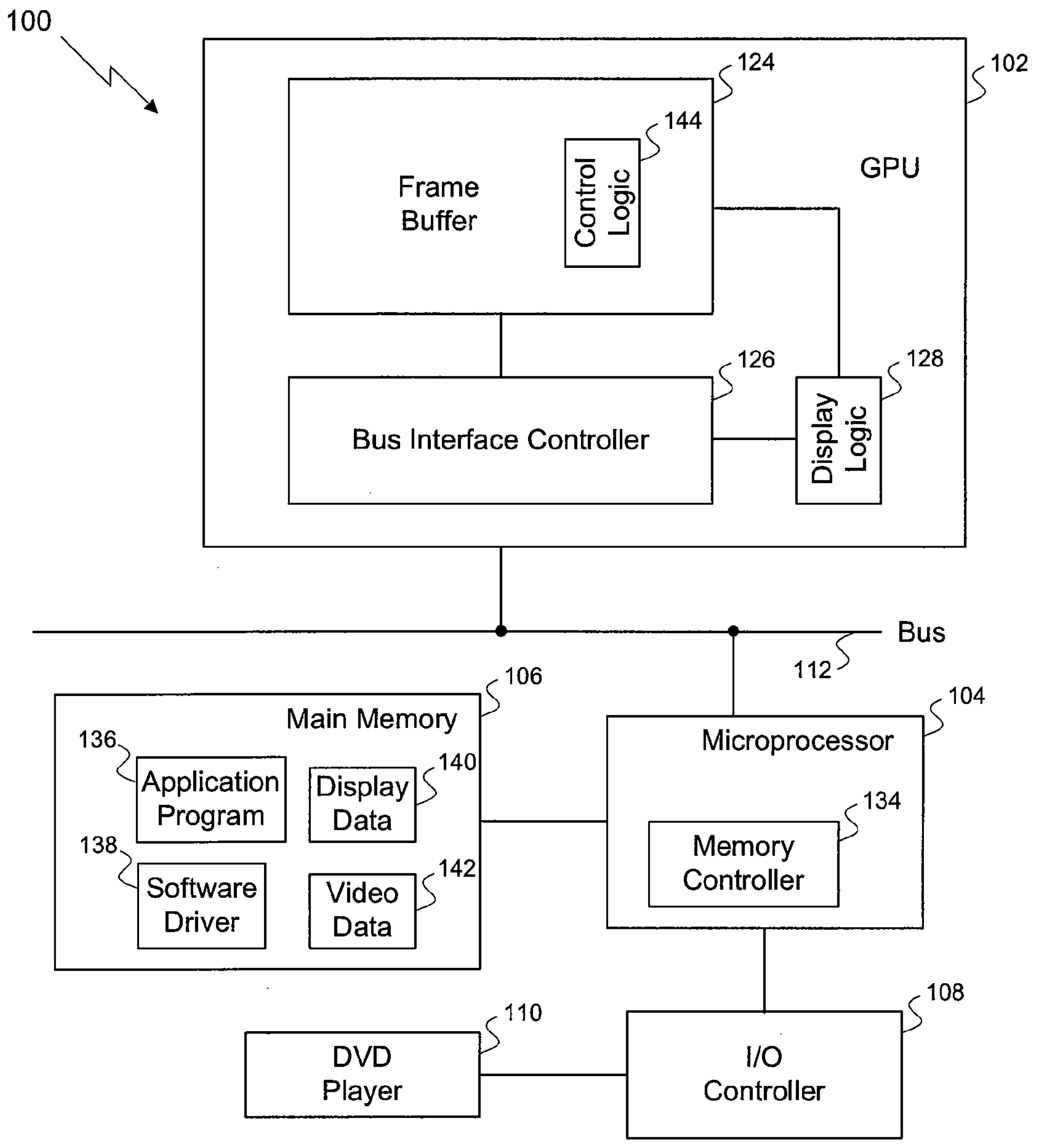
FIG. 1 illustrates a conventional mobile computing device that uses video data and display data stored in main memory to generate display frames.
Figure 2:
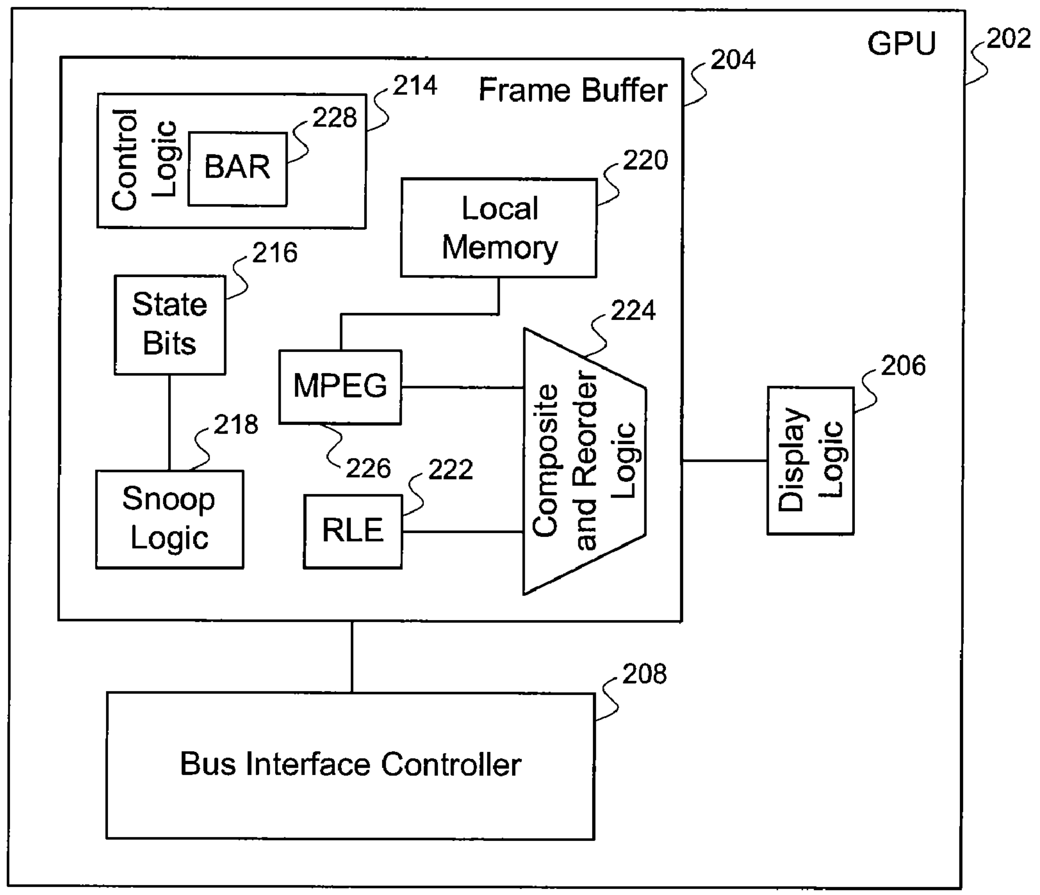
FIG. 2 illustrates functional components of a GPU according to an embodiment of the invention.

FIG. 2 illustrates functional components of a GPU 202 according to an embodiment of the invention. In the description of the invention provided below, the GPU 202 is used in place of the GPU 102 in the mobile computing device 100 shown in FIG. 1.

As shown in FIG. 2, the GPU 202 includes display logic 206, which generates display frames by overlaying video pixels onto display pixels during video playback as previously described in the discussion of FIG. 1, a frame buffer 204, which generates display pixels from display data and video pixels from video data, and a bus interface controller 208, which transfers video data and display data between the frame buffer 204 and the main memory 106 during pixel generation.

The frame buffer 204 includes a local memory 220, an RLE engine 222, which encodes display pixels and internally stores the encoded display pixels, an MPEG engine 226, which decodes video data into video pixels, and composite and reorder logic 224, which receives video pixels and display pixels from the MPEG engine 226 and RLE engine 222, respectively, and reorders these pixels into two continuous and ordered series of pixels.

Additionally, the frame buffer 204 includes a state bit memory 216, snoop logic 218, and control logic 214. The state bit memory 216 maintains a state bit for the encoded display data stored in the RLE engine 222. The snoop logic 218 monitors the bus 112 for operations that invalidate the encoded display data stored in the RLE engine 222. If the snoop logic 218 detects that display data in main memory 106 is written to, the snoop logic 218 clears the state bit that corresponds to the encoded display data stored in the RLE engine 222, causing future read or write operations on the display data to access the main memory 106. The control logic 214 directs the function of each element within the frame buffer 204 and includes a base address register file ("BAR") 228, which stores base addresses and block sizes of video data stored in the main memory 106. The state bit memory 216 also includes a state bit for each of the main memory address range defined in BAR 228. These state bits are set under software control and a state bit of "1" signifies that the corresponding main memory address range is valid. In one embodiment of the invention, up to eight address ranges may be defined in the BAR 228. In other embodiments of the invention, any technically feasible number of address ranges may be defined by the BAR 228 without departing from the scope of the invention.

In the embodiment of the invention illustrated in FIG. 2, the local memory 220 is a 2 MB embedded dynamic random access memory ("eDRAM"). In other embodiments of the invention, the local memory 220 may be any technically feasible type or size of memory without departing from the scope of the invention.

Referring to FIGS. 1 and 2, when the user initiates video playback, the application program 136 begins by reading video data from the DVD player 110 and storing the video data in the main memory 106 in encoded form. Next, the GPU 202 reads display data from the main memory 106 and uses that data to generate display pixels for the display image. Additionally, the GPU 202 reads the video data from the main memory 106 and uses the video data to generate video pixels for the video image. Finally, the display logic 206 overlays the video image over the display image and generates a display frame from the overlaid result. This display frame generation process is repeated to form a sequence of display frames, with one display frame for each video image on the DVD, unless the user interrupts the DVD playback by changing system settings, such as display resolution, or manually interrupting DVD playback.

During display pixel generation, the GPU 202 reads display data from the main memory 106 and performs operations on that display data to generate display pixels. The RLE engine 222 performs run-length encoding on the generated display pixels and stores the encoded display pixels in the RLE engine 222, allowing the GPU 202 to avoid reading display data from the main memory 106 and generate display pixels from that display data during subsequent display frame generation operations. However, future use of display data stored in the RLE engine 222 is dependent on the validity of that stored data, as determined by the value of the display data state bit in the state bit memory 216. If the snoop logic 218 determines that the display data in the main memory 106 has changed, snoop logic 218 clears the display data state bit, which causes the GPU 202 to regenerate the display pixels from display data in the main memory 106 when generating the next display frame.

During video pixel generation, the video data undergoes operations, such as inverse discrete cosine transforms (IDCT) and motion compensation, that require multiple read and write operations on the video data. The GPU 202 enables such operations to be carried out using local memory 220 for some or all of the video data. The control logic 214 directs all read and write operations of video data that are stored at addresses that fall within a valid main memory address range to be performed using the local memory 220 rather than the main memory 106. Also, when the MPEG engine 226 is reading and writing video data during video data decoding, memory operations whose addresses are within the ranges of addresses stored in the BAR 228 are directed to the local memory 220 by the control logic 214 if the state bit within the state bit memory 216 corresponding to the addresses is set (e.g., state bit value=1). Alternatively, during video data decoding, memory operations whose addresses are not within the ranges of addresses configured in the BAR 228, or whose corresponding state bits in the state bit memory 216 are clear (e.g., state bit value=0), are directed to the main memory 106 as described in the discussion of FIG. 1.

Additionally, once the MPEG engine 226 generates the video pixels for the next display frame, this group of pixels must be combined into a single, contiguous and ordered stream of pixel data to allow the display logic to use that stream of pixel data for overlaying the video image onto the display image and generating the next display frame. The composite and reorder logic 224 performs this function by unifying and ordering the video pixels from the MPEG engine 226 for use by the display logic 206. By contrast, the RLE engine 222 produces a single, contiguous and ordered stream of display pixels and no further processing is done to the display pixels by the composite and reordering logic 224. The display pixels are unified and ordered by the composite and reorder logic 224 for use by the display logic 206.

Figure 3A:
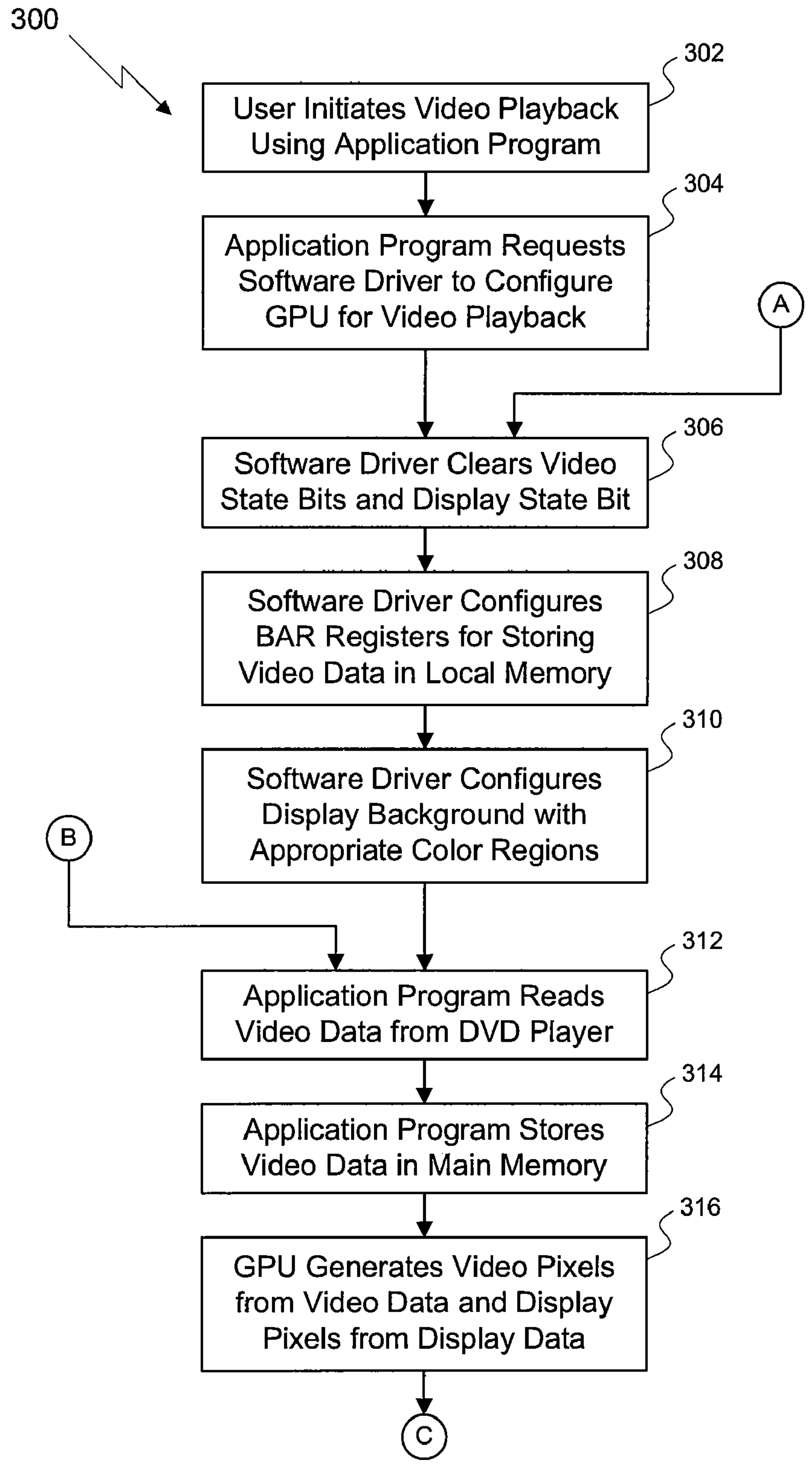
FIGS. 3A and 3B illustrate a flowchart of method steps for performing video playback using display data and video data stored in the GPU.
Figure 3B:
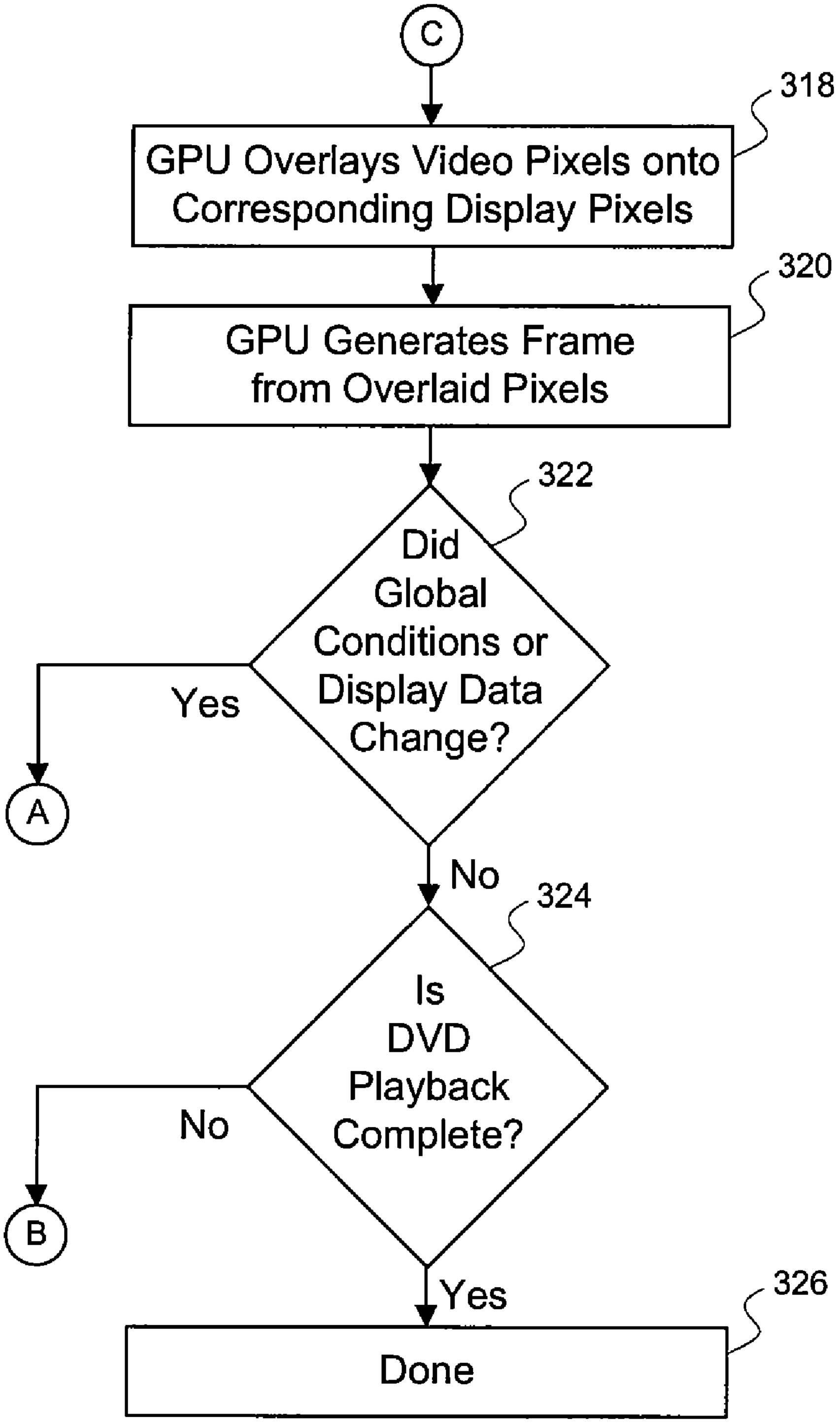

FIGS. 3A and 3B illustrate a flowchart of a method 300 for performing video playback using display data and video data stored in the GPU 202. As shown, the method 300 begins at a step 302, where a user initiates video playback using a DVD player application program. The next four steps, steps 304-310, are configuration steps. In step 304, the application program requests the graphics adapter software driver to configure the GPU 202 for video playback in preparation for beginning playback. In step 306, the software driver clears the state bits for the video data and the state bit for the display data. In step 308, the software driver programs the BAR 228 with starting addresses and block sizes that are associated with blocks of video data and sets the state bits for each of these video data blocks. As previously described, when the address of a read or write operation is within a range of addresses defined by a BAR register, the read or write operation will use the local memory 220 rather than the main memory if the state bit that corresponds to the matching entry in the BAR 228 is set. In step 310, the software driver configures the overlay functionality by selecting an overlay reference color (e.g., magenta) and filling some or all of the display image region to be overlaid with a rectangular display image of the reference color. If the aspect ratios of the display image and video image cause borders to also be generated during overlay, the software driver configures the borders with the border color (e.g., black) in this step.

Steps 312-322 are repeatedly carried out to display a sequence of display frames generated by the GPU 202 until the global display conditions or display data change or DVD playback is complete. First, the application program reads video data from the DVD player (step 312) and stores the video data in the main memory (step 314). In step 316, the GPU 202 generates video pixels for the next display frame from the video data and display pixels for the next display frame from the display data. The video data and the display data used in generating the video pixels and the display pixels may be read from the main memory or the local memory 220, as described in further detail in FIGS. 4 and 5. Upon completing step 316, video pixels are overlaid onto display pixels (step 318) and a complete display frame is generated therefrom (step 320).

In step 322, the GPU 202 checks whether any global settings changed since the beginning of the last frame generation which warrant reconfiguring the GPU 202 before generating the next frame. The changes in global settings would occur, for example, in response to any change to the display resolution or a request for the application program to skip ahead during DVD playback. If global conditions have changed since the beginning of the last frame generation, the method 300 proceeds to step 306 where the software driver reconfigures the BAR 228 to support the change to global conditions. On the other hand, if global conditions are unchanged since the beginning of the last frame generation, the method 300 continues to step 324 where the GPU 202 determines whether DVD playback has completed. If the DVD playback is complete, the method 300 proceeds to step 326 where it terminates. If DVD playback is not complete, the method 300 proceeds to step 312 where the application program reads video data for the next display frame from the DVD player.

Figure 4:
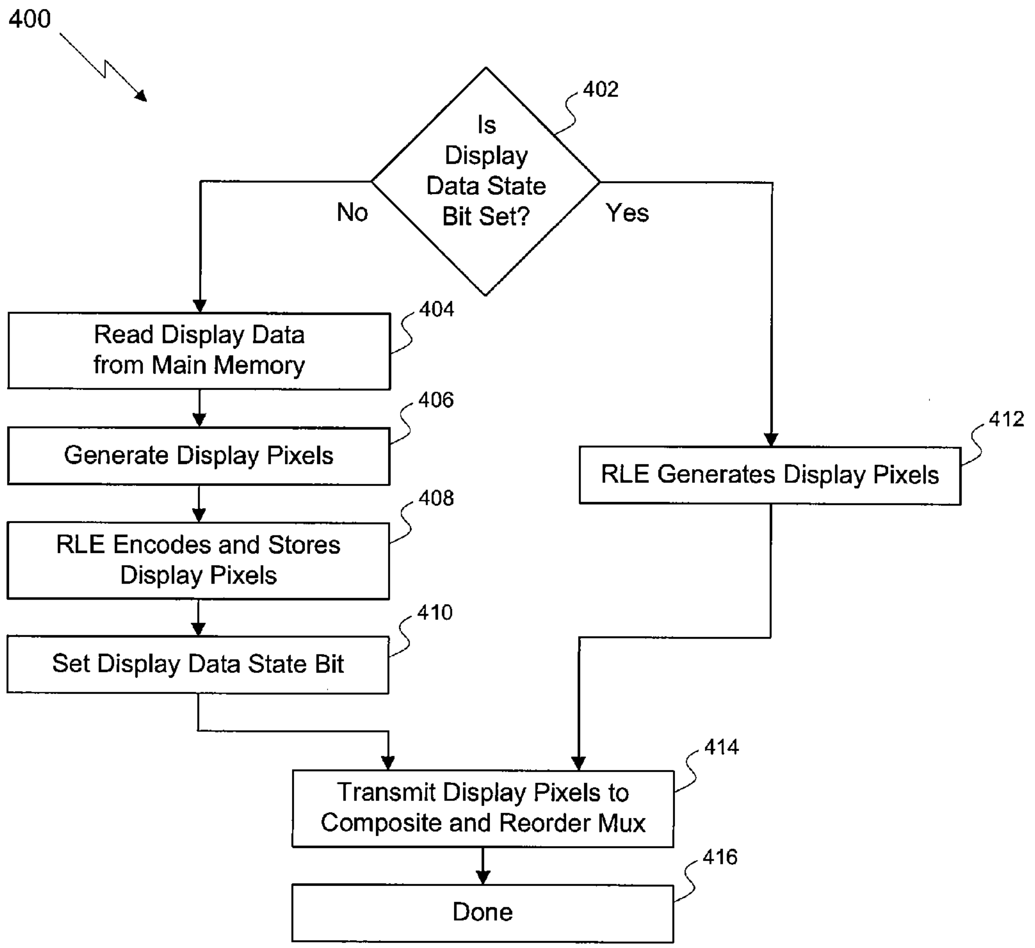
FIG. 4 illustrates a flowchart of method steps for generating display pixels from display data.

FIG. 4 illustrates a flowchart of a method 400 for generating display pixels from display data stored in main memory or the RLE engine 222 during frame generation. The display pixels generated in accordance with the method 400 are subsequently used in step 318 of the method 300. As shown, the method 400 for generating display pixels during frame generation begins with step 402, where the GPU 202 determines whether the display data state bit in the state bit memory 216 is set. If the display data state bit is not set, display data is not stored in the RLE engine 222, so the method 400 proceeds to step 404, where the GPU 202 reads display data from main memory as described in the discussion of FIG. 1. In step 406, the GPU 202 generates display pixels from the display data read in step 404. In step 408, the RLE engine 222 run-length encodes the display pixels generated in step 406 and internally stores the encoded data. In step 410, the control logic 214 sets the display data state bit in the state bit memory 216, which causes display data to be read from the RLE engine 222 rather than from the main memory during future frame generation. In step 414, the GPU 202 transmits the display pixels generated in step 406 to the composite and reorder logic 224, which orders and unifies pixels for the display logic 206, as previously described. The method 400 concludes in step 416.

Returning back to step 402, if the display data state bit is set, the method 400 proceeds to step 412, where the RLE engine 222 generates display pixels from display data stored in the RLE engine 222 during generation of a previous frame. Subsequently, in step 414, the GPU 202 transmits the display pixels generated in step 412 to the composite and reorder logic 224. The method 400 concludes in step 416.

Figure 5:
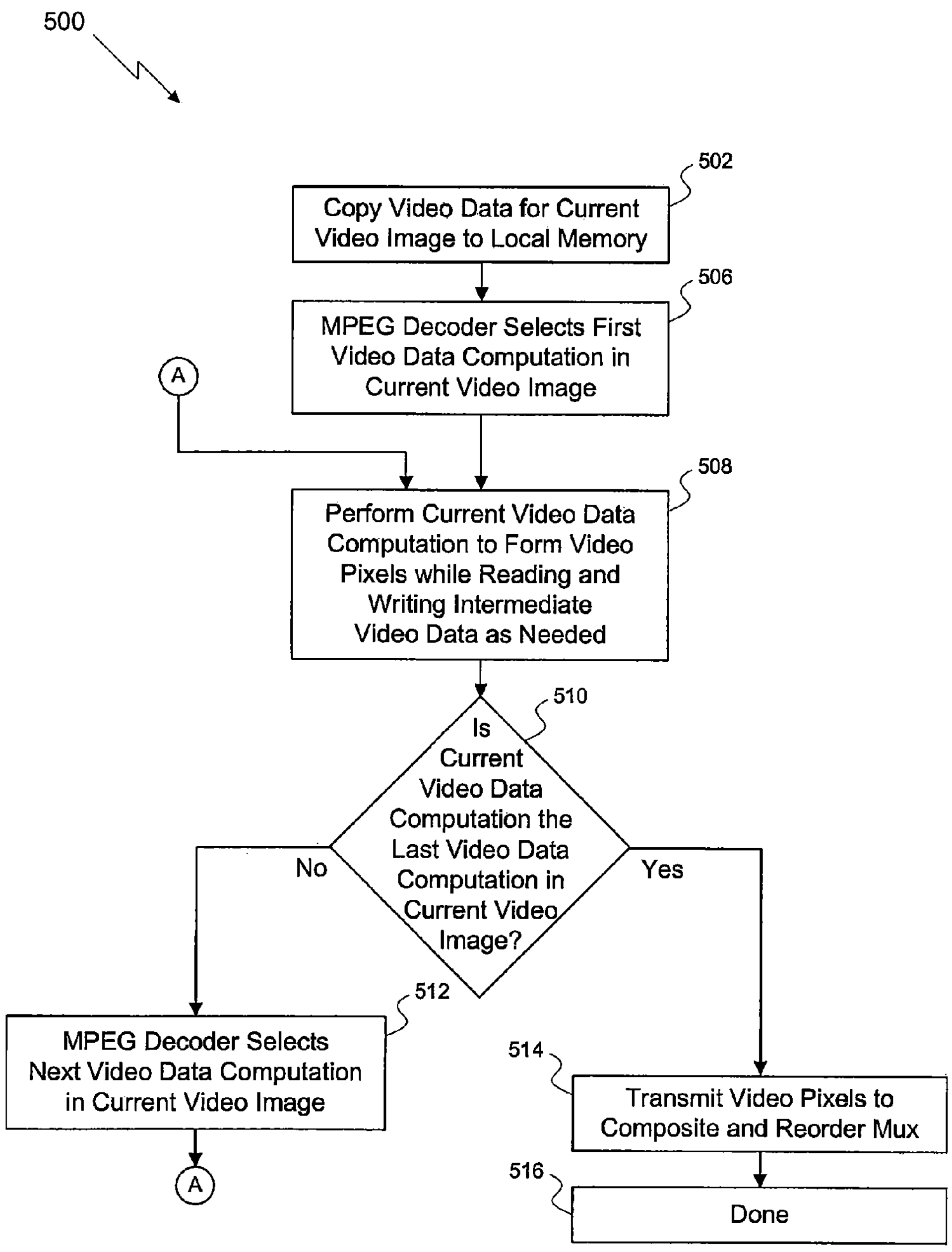
FIG. 5 illustrates a flowchart of method steps for generating video pixels from video data.

FIG. 5 illustrates a flowchart of a method 500 for decoding MPEG data read from the DVD player into video pixels. The video pixels generated in accordance with the method 500 are subsequently used in step 318 of the method 300. As shown, the method 500 for generating video pixels during frame generation begins with step 502, where some or all of the video data read from the DVD player and stored in main memory is copied to the local memory 220. A main memory block is copied to the local memory 220 for each range of addresses configured in the BAR 228 that have corresponding state bits set to 1.

In step 506, the MPEG engine 226 is initialized to begin the generation of a new video image by selecting a first video data computation in a series of video data computations for generating a video image from the current set of video data. Since the MPEG engine 226 performs a large number of computations, including read operations and write operations, to generate the video pixels for a single video image, the MPEG engine 226 repeats steps 508, 510 and 512 until all computations are complete for decoding the current video image into video pixels. In step 508, the MPEG engine 226 performs a series of read operations, MPEG decoding computations and write operations on the current video data being MPEG-decoded, which results in one or more video pixels being generated for the portion of the video image currently being MPEG-decoded. Reading and writing video data to main memory and the local memory 220 is described in the discussion of FIGS. 6 and 7, respectively. In step 510, the MPEG engine 226 determines whether it has completed the video data decoding for the entire current video image. If the MPEG engine 226 has not completed the video data decoding for the entire current video image, the method 500 proceeds to step 512, where the MPEG engine 226 selects the next video data computations for generating the video pixels of the current video image, before continuing to step 508.

Returning back to step 510, if the MPEG engine 226 has completed the video data decoding for the entire current video image, the method proceeds to step 514, where the MPEG engine 226 transmits the video pixels to the composite and reorder logic 224, which unify and order the pixels for the display logic 206. The method concludes in step 516.

Figure 6:
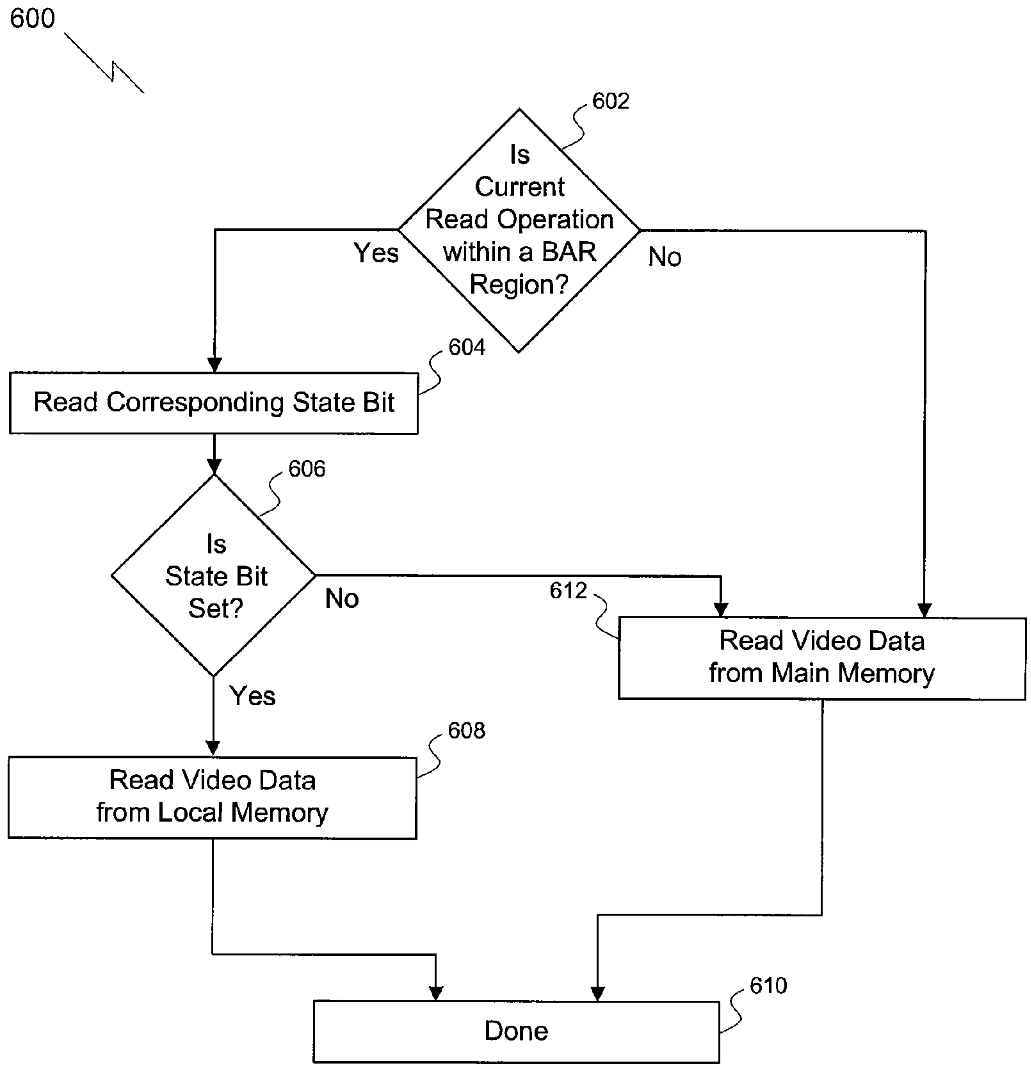
FIG. 6 illustrates a flowchart of method steps for reading video data from either a local memory or main memory.

FIG. 6 illustrates a flowchart of a method 600 for reading video data from either the local memory 220 or main memory. The method 600 is carried out when reading video data in conjunction with the MPEG decoding method 500. As shown, the method 600 for reading video data from either the local memory 220 or main memory begins with step 602, where the GPU 202 determines whether the address of the current read operation is within an address range defined in the BAR 228. If the address of the current read operation is within an address range in the BAR 228, the method proceeds to step 604, where the state bit in the state bit memory 216 corresponding to the matching entry in the BAR 228 from step 602 is read. In step 606, the GPU 202 determines whether the state bit read in step 604 is set. If the state bit read in step 604 is set, the method proceeds to step 608, where the GPU 202 reads the video data from the portion of the local memory 220 that corresponds to the matching BAR entry from step 602. The method then concludes in step 610.

Alternatively, if the address of the current read operation is not within an address range in the BAR 228 (step 602) or if the state bit read in step 604 is clear (step 606), the method proceeds to step 612, where the GPU 202 reads the video data from the main memory, as described in the discussion of FIG. 1. The method then concludes in step 610.

Figure 7:
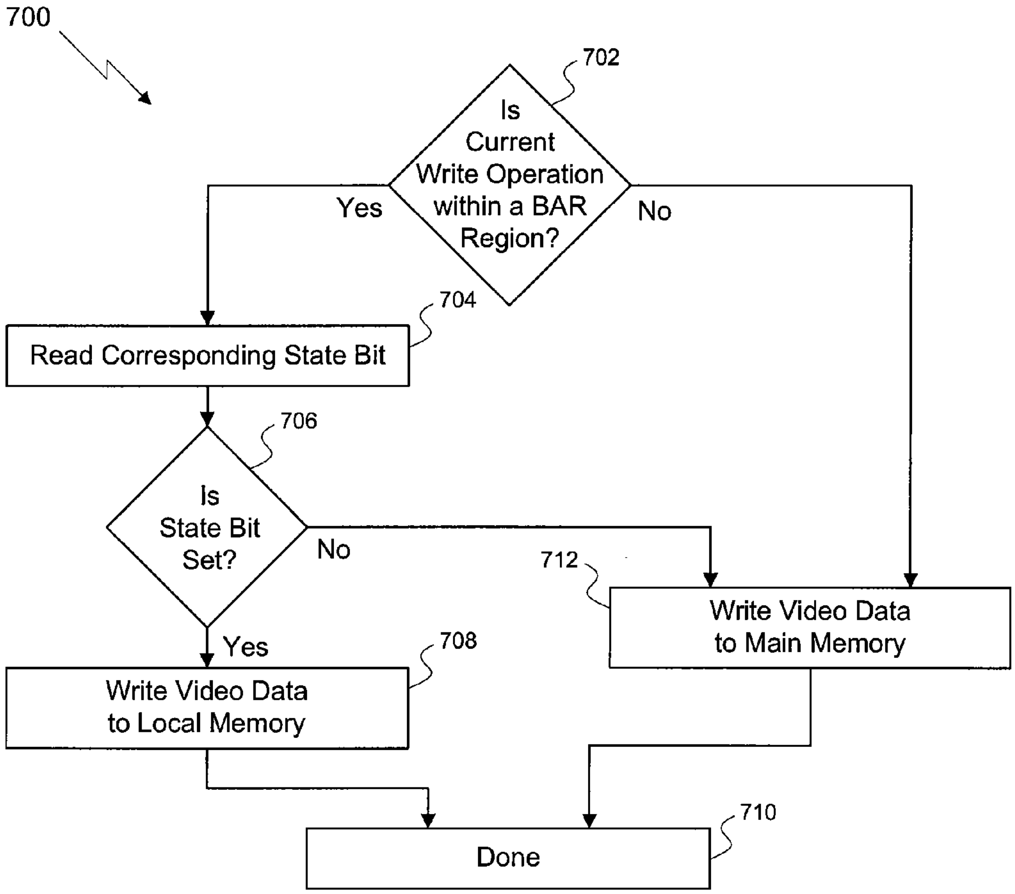
FIG. 7 illustrates a flowchart of method steps for writing video data to either a local memory or main memory.

FIG. 7 illustrates a flowchart of a method 700 for writing video data to either a local memory 220 or main memory. The method 700 is carried out when writing video data in conjunction with the MPEG decoding method 500. As shown, the method 700 for writing video data to either the local memory 220 or main memory begins with step 702, where the GPU 202 determines whether the address of the current write operation is within an address range defined in the BAR register file 228. If the address of the current write operation is within an address range in the BAR 228, the method proceeds to step 704, where the state bit in the state bit memory 216 corresponding to the matching entry in the BAR 228 from step 702 is read. In step 706, the GPU 202 determines whether the state bit read in step 704 is set. If the state bit read in step 704 is set, the method proceeds to step 708, where the GPU 202 writes the video data to the portion of local memory 220 that corresponds to the matching BAR entry from step 702. The method then concludes in step 710.

Alternatively, if the address of the current write operation is not within an address range in the BAR 228 (step 702) or if the state bit read in step 704 is clear (step 706), the method proceeds to step 712, where the GPU 202 writes the video data to the main memory. The method then concludes in step 710.

One advantage of the disclosed technique is that the power consumed by mobile computing devices may be reduced by generating display images from display pixels stored in the RLE engine 222 rather than reading display data from main memory and generating display pixels from that display data. Another advantage of the disclosed technique is that the power consumed by mobile computing devices may be reduced by generating video images from video data stored in the local memory 220 rather than the main memory. Yet another advantage of the disclosed technique is that the graphics performance of the GPU 202 is not reduced by the technique, due to encoding and storing display pixels "on-the-fly" in the RLE engine 222 during frame generation.

Figure 8A:
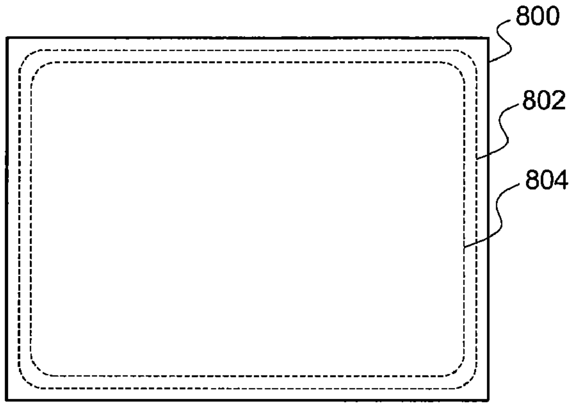
FIGS. 8A-8C illustrate sample displays that are generated with embodiments of the present invention.
Figure 8B:
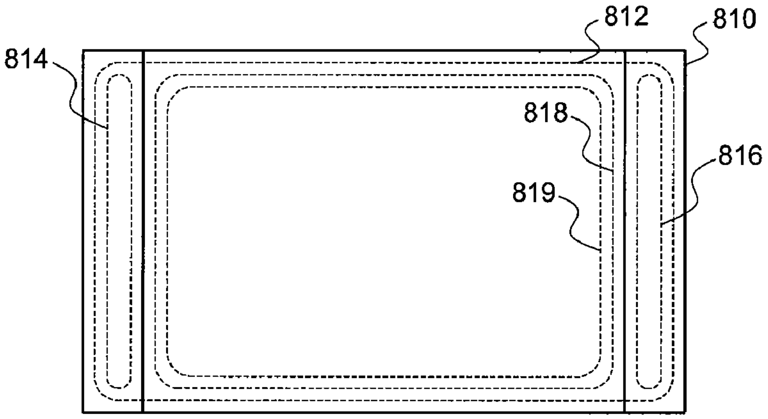
Figure 8C:
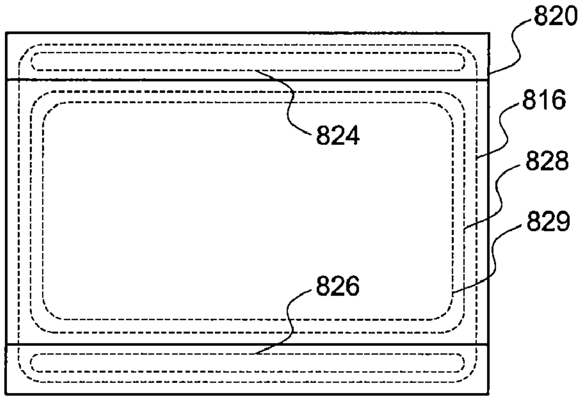

FIGS. 8A-8C illustrate sample display frames 800, 810 and 820 generated with embodiments of the present invention. FIG. 8A illustrates a sample display frame 800 generated with embodiments of the present invention when the aspect ratio of the display monitor matches that of the aspect ratio of the video image. In this example, a video image 802 fully obscures a display image 804 after overlay. The display image 804 comprises display pixels of a single reference color (e.g., magenta) and the display pixels are run-length encoded as a single region by the RLE engine 222 and stored therein. FIG. 8B illustrates a sample display frame 810 generated with embodiments of the present invention when the aspect ratio of a display image 812 is greater than the aspect ratio of a video image 818. In this example, the video image 818 is displayed with left and right borders 814, 816 of a color determined by the software driver (e.g., black). The display image in this example comprises display pixels of a single reference color (e.g., magenta) for an image region 819, on top of which the video image 818 is overlaid, and display pixels of a single color for the left border 814 and the display pixels of a single color for the right border 816. The display pixels are run-length encoded as three regions by the RLE engine 222 and stored therein. FIG. 8C illustrates a sample display frame 820 generated with embodiments of the present invention when the aspect ratio of a display image 816 is less than the aspect ratio of a video image 828. In this example, the video image 828 is displayed with top and bottom borders 824, 826 of a color determined by the software driver (e.g., black). The display image 816 comprises display pixels of a single reference color (e.g., magenta) for an image region 829, on top of which the video image 828 is overlaid, and display pixels of a single color for the top border 824 and the display pixels of a single color for the bottom border 826. These display pixels are run-length encoded as three regions by the RLE engine 222 and stored therein.

As used herein, "local memory" is used to refer to any memory that is local to a processing unit and is distinguished from main memory or system memory. Thus, any of the memory units inside the frame buffer 204 are "local memory" to the GPU 202, including the local memory 220, state bit memory 216, BAR 228, and the memory inside the RLE engine 222.

While the foregoing is directed to embodiments of the present invention, other and further embodiments of the invention may be devised without departing from the basic scope thereof. The scope of the present invention is determined by the claims that follow.

We claim:

1. A processing unit comprising:

a first memory for storing encoded display data;

a second memory for storing encoded video data;

a third memory for storing base addresses corresponding to memory locations of multiple blocks of the encoded video data;

a fourth memory for storing status bits associated with each of the base addresses;

a first processing engine for generating display pixels from the encoded display data;

a second processing engine for generating video pixels from the encoded video data; and a display logic unit for generating a display frame from the display pixels and the video pixels.

2. The processing unit according to claim 1, wherein the first processing engine comprises a run-length encoding (RLE) processing engine and the second processing engine comprises a Motion Picture Expert Group (MPEG) processing engine.

3. The processing unit according to claim 1, further comprising a bus interface controller for communicating with a main memory having encoded video data stored therein, wherein the encoded video data stored in the main memory is received through the bus interface controller and stored in the second memory.

4. The processing unit according to claim 1, wherein the second processing engine generates video pixels with reference to the settings of the status bits.

5. The processing unit according to claim 4, further comprising a fifth memory for storing a display status bit associated with the encoded display data and a snoop logic unit that monitors for changes in the display data and resets the display status bit in response to changes in the display data.

6. A method for generating a sequence of display frames, comprising:

storing encoded display data in a first memory;

storing encoded video data in a second memory;

storing base addresses corresponding to memory locations of multiple blocks of the encoded video data in a third memory;

storing status bits associated with each of the base addresses in a fourth memory;

generating display pixels from the encoded display data;

generating video pixels from the encoded video data; and generating a display frame from the display pixels and the video pixels.

7. The method according to claim 6, wherein a run-length encoding (RLE) processing engine generates the display pixels, and a Motion Picture Expert Group (MPEG) processing engine generates the video pixels.

8. The method according to claim 6, further comprising, prior to storing the encoded video data in the second memory, receiving the encoded video data through a bus interface controller.

9. The method according to claim 6, wherein the video pixels are generated with reference to the settings of the status bits.

10. The method according to claim 9, further comprising:

storing a display status bit associated with the encoded display data in a fifth memory;

monitoring the display data for changes; and resetting the display status bit in response to a change in the display data.

* * * * *